United States Patent [19]

Allan

[11] 4,153,121

[45] May 8, 1979

[54] FLUID OPERATED UNDERCUTTER

[75] Inventor: David T. Allan, Glasgow, Scotland

[73] Assignee: John MacDonald & Company (Pneumatic Tools) Ltd., Great Britain

[21] Appl. No.: 749,611

[22] Filed: Dec. 13, 1976

[30] Foreign Application Priority Data

Dec. 29, 1975 [GB] United Kingdom ............... 53060/75

[51] Int. Cl.² .................................................. E25B 9/00
[52] U.S. Cl. ................................................... 175/96; 173/31; 173/96; 173/101; 175/99; 175/103; 175/266
[58] Field of Search ................... 175/99, 95, 96, 78, 175/103, 266, 296, 293, 267; 173/32, 31, 33, 94–97, 101, 52; 145/124; 15/104.07

[56] References Cited

U.S. PATENT DOCUMENTS

| 1,236,371 | 8/1917 | Gilman | 175/103 |
| 1,461,713 | 7/1923 | Gilman et al. | 175/96 |
| 2,942,850 | 6/1960 | Heath | 175/96 |
| 3,101,499 | 8/1963 | Greenfield | 15/104.07 |
| 3,386,250 | 6/1968 | Lawrence et al. | 173/33 X |

FOREIGN PATENT DOCUMENTS

492822  2/1930  Fed. Rep. of Germany .......... 175/103

*Primary Examiner*—William Pate, III
*Attorney, Agent, or Firm*—Bertram Frank

[57] ABSTRACT

The invention herein relates to an undercutting device which is provided with a substantially tubular body adapted to be placed within a parallel-sided hole. A rotary percussion head is provided at one end of the body and has one or more cutting tools which extend radially therefrom at an obtuse angle and which cutting tools are adapted to cut outwardly from the radius of the body, means are provided for rotating the head about the axis of the body and for operating the percussion head at one predetermined depth in the hole so that the cutting tools may act on the wall of the parallel-sided hole.

3 Claims, 9 Drawing Figures

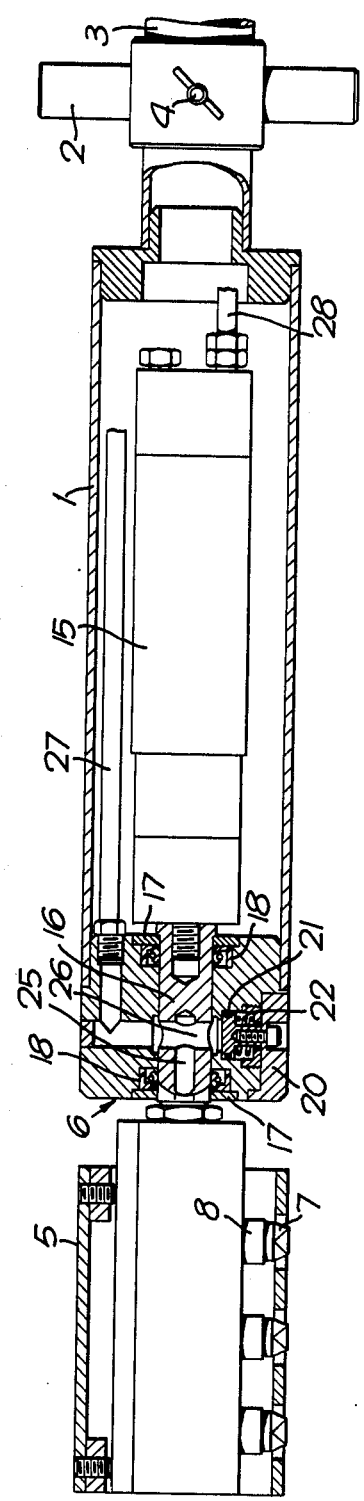
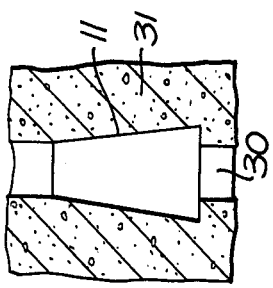
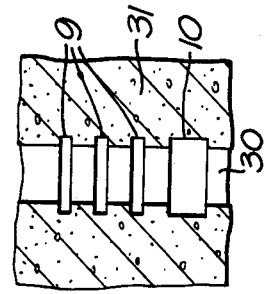

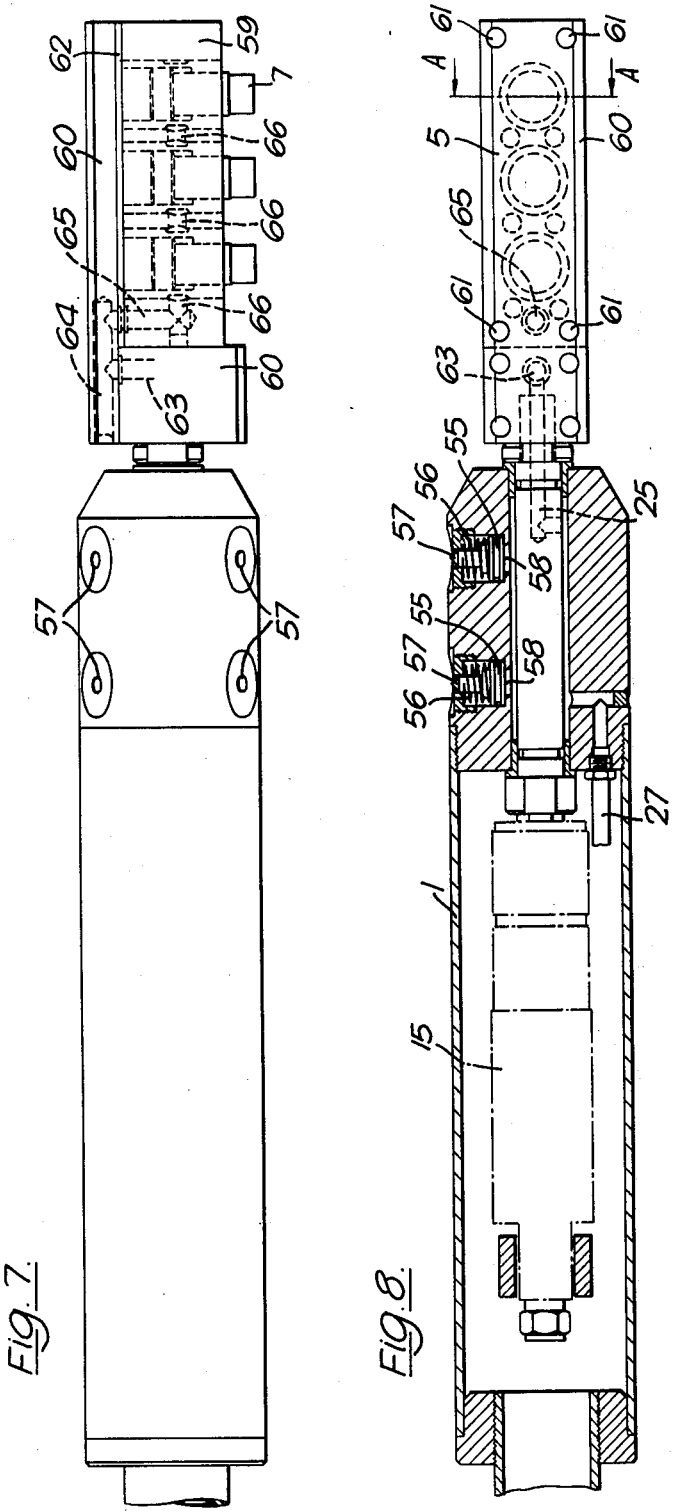

FLUID OPERATED UNDERCUTTER

This invention relates to undercutters.

In civil engineering there has always existed a problem in providing adequate fixings in concrete or rock structures, for example, in securing bolts or reinforcing rods to the structure. At the present time fixings are normally formed simply by drilling a parallel-sided hole in the structure using a fluid (normally pneumatic) or electrically-operated drill with a diamond or tungsten carbide tipped bit. Holes drilled by this method commonly have an extremely smooth wall. The bolt or rod is then inserted in the hole and grouting cement or an epoxy resin poured between the bolt or rod and the walls of the hole. This method suffers from the serious disadvantage that, in order to obtain an adequate grip in the structure, the hole must be very deep so as to provide an adequate area of contact between the grouting cement or resin and the structure especially when the wall of the hole is smooth.

Clearly, it would be a distinct advantage if instead of the hole having smooth parallel sides it had a roughened surface, had undercut formations or was inwardly divergent so as to increase the keying effect and the area of contact of the grouting cement or resin and so that the cured cement or resin was not relying purely on the bond between the cement or resin and a smooth wall of the structure to prevent withdrawal.

Thus, an object of the present invention is to provide an undercutter which can roughen or provide an undercut formation on a parallel-sided hole or form a parallel-sided hole into an inwardly divergent hole.

Thus, according to the present invention there is provided an undercutter comprising a substantially tubular body adapted to be received within a parallel-sided hole, a rotary percussion head at one end of said body and having one or more cutting tools radially extending from, obtusely angled to, and adapted to cut outwardly from the axis of said body, means for operating said head about the axis of said body and means for operating said percussion head at any predetermined depth in said hole so that the cutting tools act on the wall thereof.

Preferably, said means for rotating the head comprises a rotary motor located externally of the tubular body portion and the hole and which is slung from a housing having supporting legs surrounding said hole and in which the tubular body is in the form of a square tube which is rotated by said rotary motor through a pinion and gearwheel.

Preferably also, the undercutter includes clamping jaws in the form of fluid operated piston and cylinder units mounted on said body and in which the jaw members mounted on the pistons are engageable with the wall of a hole so as to centralise said body therein.

Embodiments of the present invention will now be described, by way of example, with reference to the accompanying drawings, in which:

FIG. 1 is a sectional view of a fluid-operated undercutter according to the invention;

FIG. 2 is a sectional view of a hole in a concrete structure and provided with stepped formations formed by the undercutter shown in FIG. 1;

FIG. 3 is a sectional view of a hole in a concrete structure which has been formed to be inwardly divergent using a modified undercutter according to the invention;

FIG. 7 is a side view of a still further modified undercutter according to the invention;

FIG. 8 is a partially sectioned plan view corresponding to FIG. 7; and

Figure 4:
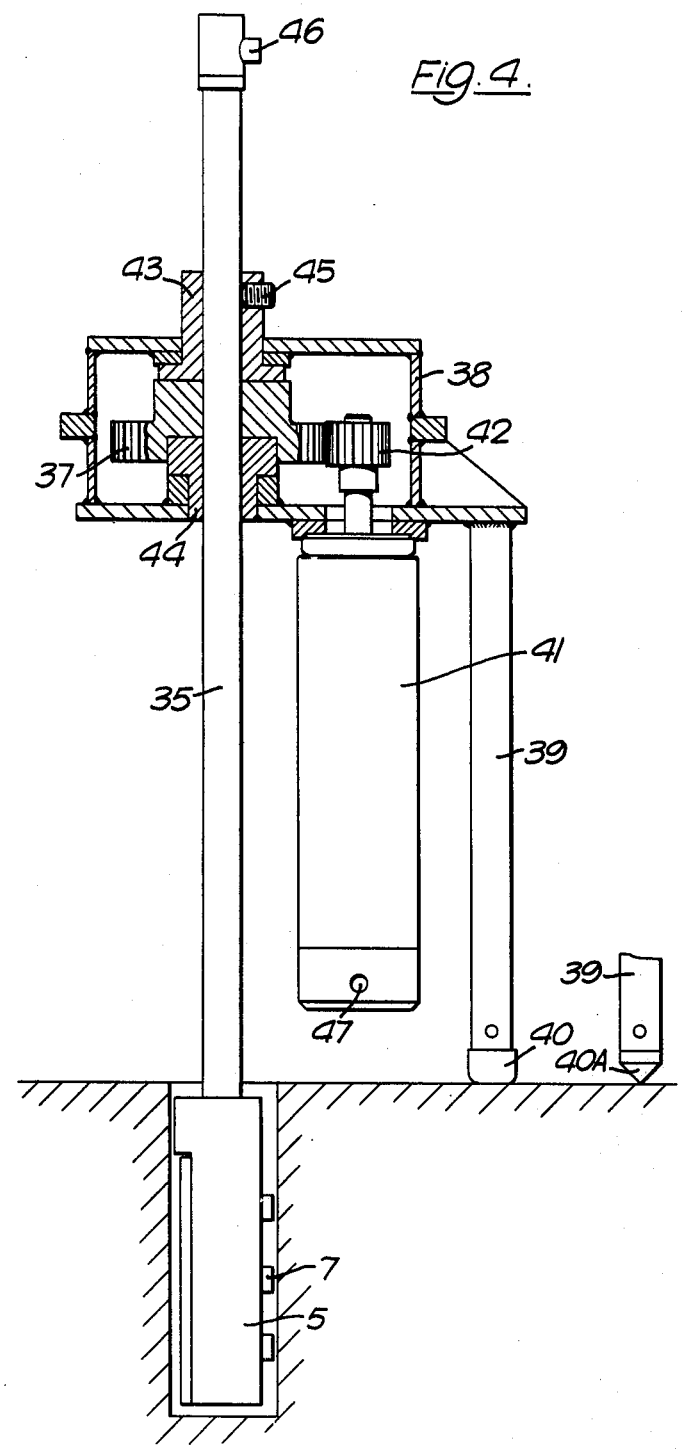
FIGS. 4 and 5 are side and plan views of a further modified undercutter according to the invention.

Referring to the drawings, a fluid-operated undercutter shown in FIG. 1 comprises a tubular body portion 1 which is adapted to be received in a hole in a concrete structure. The depth of the undercutter in the hole is set by a depth guide 2 located on a tubular extension 3 of the body portion and adjustable thereon by means of a grub screw 4.

A rotary percussion head 5 is journalled in the end 6 of the body portion 1 so as to be rotatable in the hole in the concrete structure about the axis of the body portion 1. The percussion head is substantially cylindrical and is provided with a plurality of cutting tools 7 operated by air piston and cylinder units 8 to provide a percussive effect in a known manner so as to cut outwardly from the axis of the body portion 1. In the embodiment shown in FIG. 1 the cutting tools are located in spaced rows and will therefore produce a stepped formation on the inside wall of the hole in the concrete structure. The shape of such a hole is shown in FIG. 2, each cutting tool 7 having undercut a groove 9 in the wall of the hole. Clearly, by adjustment of the depth guide 2 these grooves can be formed in any desired position of the hole either individually, or formed together, as shown at 10 in FIG. 2, to provide a larger groove. The piston and cylinder units 8 of the percussion head 5 are preferably screw adjustable so that the depth of groove 9 can be adjusted. The cutting tools 7 may be formed integrally with the piston of the piston and cylinder units 8 or may be detachable. Moreover, instead of cutting grooves the surface of the hole may be merely roughened.

In a modification the cutting tools are arranged on the percussion head so that their working areas overlap. Thus, by adjusting the depth of cut along the length of the head a downwardly divergent undercut may be formed as shown at 11 in FIG. 3. The percussiom head 5 is rotated by an air motor and reduction gearbox 15 located within the tube 1 and connected to the head 5 by a shaft 16. The shaft is journalled in bearings 17 and fluid seals 18 are provided to prevent air leakage through the bearings.

Three expanding clamping jaws 20 are provided at the end 6 of the tube 1 and spaced at 120° to each other. Each jaw is operated by a single acting piston and cylinder 21 provided with a spring 22 adapted to bias the jaw into its disengaged position.

Compressed air is fed to the percussion head 5 through a duct 25 in the shaft 16 and to the piston and cylinder units 21 through ducts 26 also formed in the shaft 16. A pipe 27 supplies compressed air to the duct 26 and a pipe 28 supplies air to the motor 15. The pipes 27 and 28, in use, pass to the surface of the concrete structure through the extension tube 3.

in operation, the tube 1 is lowered into a parallel-sided hole in a concrete structure to a depth set by the depth gauge 2 whereupon compressed air is supplied to the unit which automatically activates the piston and cylinder units 21 so as to engage the clamping jaws 20 on the inside wall of the hole. Simultaneously, the air supply passes to the percussion head 5 and operates the cutting tools 7. Compressed air is also supplied through the pipe 28 to the motor 15 which rotates the percussion head 5 so that the tools 7 cut a groove 9 in the wall of the hole or at least roughen its surface.

From FIGS. 2 and 3 it can be seen that if a fixing bolt is to be placed in a hole 30 in a concrete structure 31 then the hole can be undercut with either grooves 9, 10 or an inwardly divergent undercut 11. Thus, when grouting cement or an epoxy resin is poured into the hole around the fixing bolt it will fill the grooves or undercuts and provide a good bond with the concrete structure.

Figure 5:
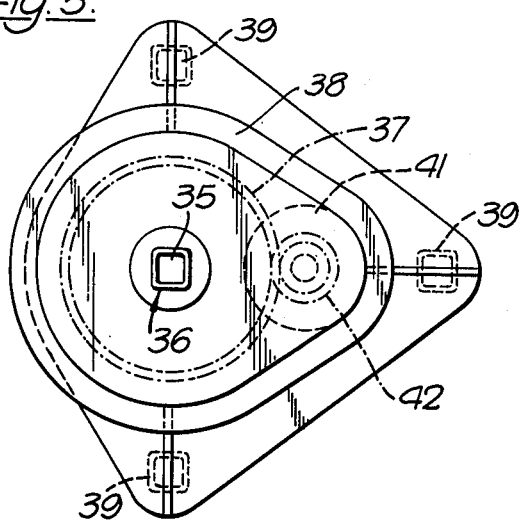
Figure 6:
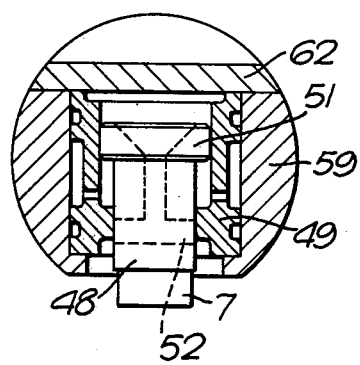
FIG. 6 is a sectional end view of the cutting head of the undercutter shown in FIGS. 4 and 5.

A further modified embodiment is shown in FIGS. 4 to 6. In this embodiment the body 1 is in the form of a square tube 35 which in use extends out of the hole and passes through a square hole 36 in a gearwheel 37 journalled in a housing 38. The latter is provided with three legs 39 which support it from the ground through rubber or hardened steel feet 40, 40A. An air motor 41 is slung from the casing 38 and drives the gearwheel 37 through a pinion 42. Collars 42 and 44 are provided on the upper and lower surfaces, respectively of the gearwheel 37 to provide stability to the tube 35, and the working depth of the percussion head 5 is adjustable by locking the tube in the desired position with a grub screw 45. Air is supplied to the percussion head 5 through a swivel connection 46 and to the motor through a connection 47. When deeper holes are being cut then collets can be provided along the length of the tube 35 so as to maintain the tube 35 centrally of the hole. The collets are preferably provided with pneumatically-operated clamping jaws.

The percussion head 5 comprises a tool 7 (as previously described) which is formed integrally with a piston 48 (FIG. 6) which is in turn reciprocable in a cylinder 49 having an air inlet port 50. The piston 48 has a head 51 the upper surface of which communicates with a cross-port 52 in the piston body through a duct 53. A land 54 is formed on the cylinder wall through which the body of the piston slides so as to selectively cover the cross-port 52, open it to the atmosphere or to the inlet air pressure thereby providing a reciprocating motion to the piston.

Figure 9:
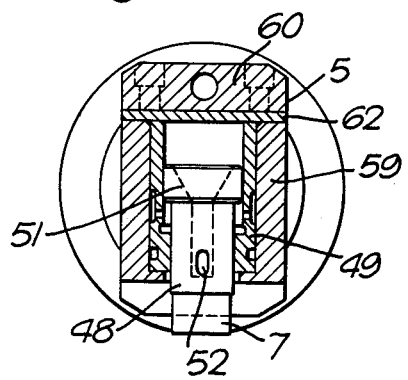
FIG. 9 is a sectional end view on the line A—A of FIG. 8.

FIGS. 7 to 9 show a further modified embodiment corresonding substantially to the embodiment described with reference to FIGS. 1 and 2 of the drawings, corresponding parts being identified by the same reference numerals. In this embodiment the clamping jaws are formed by six single acting pistons 55 biased by springs 56 towards their withdrawn position, as shown in FIG. 8. The pistons are provided with pointed jaw members 57 which are adapted to engage the side of a hole when compressed air is supplied to the faces 58 of the piston 55 as previously described. The percussion head 5 shown in FIGS. 7 to 9 operates as previously described with reference to FIG. 6. In this case, however, the piston and cylinder units are mounted in a cylinder block 59 which is detachably secured to the main body 60 of the head 5 through set pins 61. This arrangement allows the effective cutting depth of the head to be adjusted by insertion of spacers 62 of varying thicknesses between the block 59 and the body 60. Air is supplied to the piston and cylinder units through the central duct 25, and ducts 63, 64 and 65 as shown in FIGS. 6 and 7. The duct 65 passes through a hole in the spacer 62 and terminates in a supply duct 66 which passes along the length of the block 59 to supply each piston and cylinder unit.

In the above described embodiments the drive motor and the percussion head are pneumatically operated. Clearly, however, each could alternatively be hydraulically or electrically operated. Moreover, in undercutters for use in small diameter holes the drive motor may be dispensed with and the head rotated manually. Furthermore, dependent on the application, the clamping jaws may be dispensed with as in the embodiment described with reference to FIGS. 4 to 6 of the drawings.

Other improvements or modifications may be made without departing from the scope of theinvention and while the undercutter has been described for use in undercutting holes for fixing bolts with grout or epoxy resin, clearly it may be used in fixing bolts using mechanical fixing devices or for any other undercutting application, for example, undercutting shot holes for blasting.

I claim:

1. An undercutter comprising a substantially tubular body adapted to be received within a parallel-sided hole; a rotary percussion head at one end of the body and having one or more cutting tools radially extending from, obtusely angled to, and adapted to cut outwardly from the axis of said body; means for rotating said head about the axis of said body; and means for operating said percussion head at any predetermined depth in said hole so that the cutting tools act on the wall thereof, said percussion head being cylindrical and is provided with a plurality of cutting tools which are disposed in rows spaced axially with respect to said body.

2. An undercutter comprising a substantially tubular body adapted to be received within a prallel-sided hole; a rotary percussion head at one end of the body and having one or more cutting tools radially extending from, obtusely angled to, and adapted to cut outwardly from the axis of said body; means for rotating said head about the axis of said body; and means for operating said percussion head at any predetermined depth in said hole so that the cutting tools act on the wall thereof, and wherein cutting tools are provided on the percussion head spaced axially with respect to said body and arranged so that their working areas overlap.

3. An undercutter comprising a substantially tubular body adapted to be received within a parallel-sided hole; a rotary percussion head at one end of the body and having one or more cutting tools radially extending from, obtusely angled to, and adapted to cut outwardly from the axis of said body; means for rotating said head about the axis of said body; and means for operating said percussion head at any predetermined depth in said hole so that the cutting tools act on the wall thereof, and wherein the percussion head comprises a cylinder block detachably secured to the main body of the head through a spacer extending normal to the line of action of the cutting tools, the thickness of which determines the diameter cut by the cutting tool.

* * * * *